Aug. 26, 1947.  L. ESPENSCHIED  2,426,189
OBJECT LOCATING SYSTEM
Filed Oct. 4, 1941
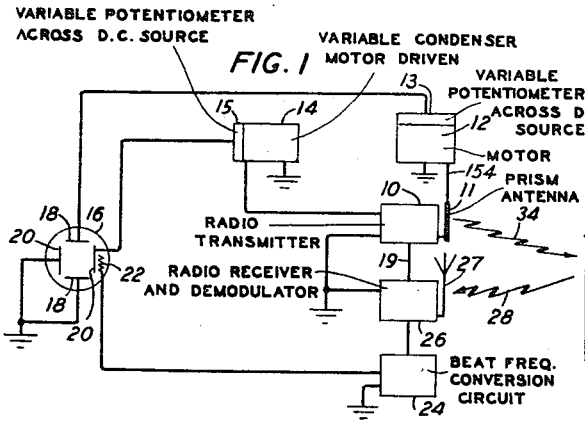
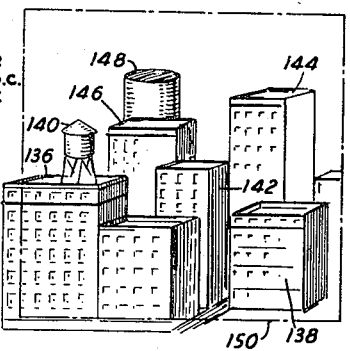
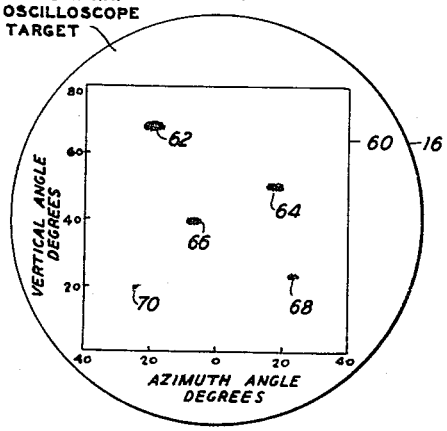
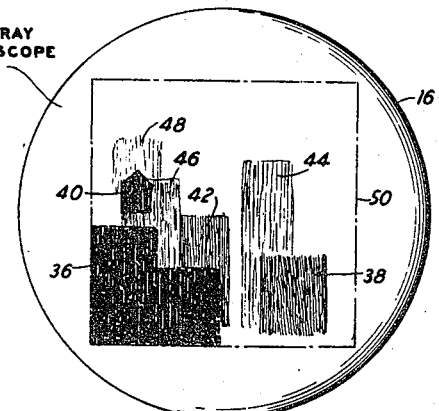
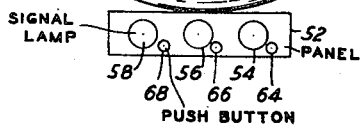
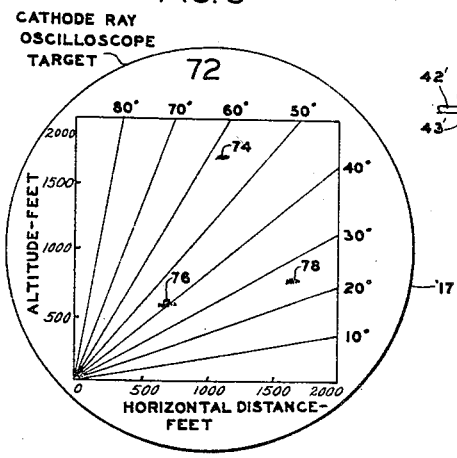
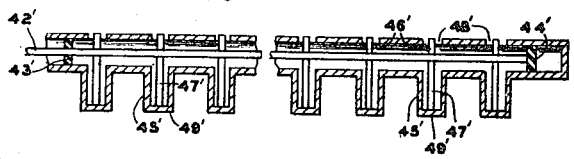
INVENTOR
L. ESPENSCHIED
BY
H. O. Wright
ATTORNEY Patented Aug. 26, 1947

2,42(

UNITED STATES PATENT OFFICE 2,426,189

OBJECT LOCATING SYSTEM

Lloyd Espenschied, Kew Gardens, N. Y., assignor to Bell Telephone Laboratories, Incorporated, New York, N. Y., a corporation of New York Application October 4, 1941, Serial No. 413,587

8 Claims. (Cl. 250—1.74)

This invention relates to systems and methods employing reflected radio wave energy for visually presenting three-dimensional representations of the number and the respective positions and distances of objects within a region at a distance from the point of observation.

More particularly, the invention relates to systems and methods for use under conditions of fog, darkness or low visibility to provide a visual integrated representation of the number and the respective positions and distances of objects within a region at a distance from the point of observation.

In my joint application with J. G. Chaffee, Serial No. 353,902, filed August 23, 1940, a system is described wherein a two-dimensional representation of the number and position of objects within an area at a distance from an aircraft is provided. In this system, however, only azimuth angle (horizontal angle or position) and distance to each respective object in the area is presented.

In accordance with the present invention both vertical and horizontal positional indications are to be provided in addition to indications of the respective distances of each object within the region explored.

Briefly stated, the invention provides for the two-dimensional scanning of a region with electromagnetic waves, determining the reflection time for receipt of the reflected waves from each object within the region and the presentation as a two-dimension picture of the respective horizontal and vertical angles or positions of each respective object, with the third dimension (i. e., distance) represented in the picture in terms of the relative intensities of the marks that correspond to the objects.

For slow moving craft or for operation from a fixed position the scanning may be done mechanically by oscillating highly directive transmitting or receiving antennas or both to methodically scan the desired region and to receive reflections of wave energy from objects therein.

For rapidly moving craft, such as modern aircraft, electrical scanning, for example, that which can be obtained by passing a variable frequency wave through an electromagnetic prism is more suitable. One type of electromagnetic prism suitable for scanning a line by means of a radio beam deflected in a single plane is described in the copending application of W. P. Mason, Serial No. 381,236, filed March 1, 1941. By mechanically turning such a prism about its longitudinal axis an area can be scanned. More elaborate area scanning prisms are described in a second copending application of W. P. Mason, S( 434,396, filed March 12, 1942.

Horizontal and vertical dimensions, o] can, of course, be readily reproduced in the picture itself by a movable member caused to scan an area of the picture or 1 surface in synchronism with the scannir region by the electromagnetic waves. T] able member is most conveniently either light as employed in a two-dimensional ga eter type scanning oscilloscope or the elec of a cathode ray oscilloscope.

The distances to the respective object; determined either by pulsing the transmis determining the pulse travel time betwee sion and receipt of the reflected pulses of several well-known methods or by quency modulation method described in ents 2,045,071 and 2,045,072, both issu 23, 1936, in which beat notes, the freque which are indicative of the respective c from the reflecting surfaces, are obtain( distance indications are then employed the intensity of the indication provide( screen of the indicator for each of the re objects. For example, objects a short away can be represented by bright or in{ dicating marks and those more distan{ intense marks in proportion to the incre; tance of the objects.

The above-indicated procedures provi( resentation in which the horizontal and directions, or angles, of an object are rep by the horizontal and vertical positions tively, of a corresponding mark on the i and the distance to an object is indicate intensity or brilliance of its correspondii Such representations should not be confu photographic or pictorial representa{ which variations of intensity indicate di in color or reflecting properties, or illui of the several objects and to a much l( gree distance to the objects as seen di light frequencies.

Since electromagnetic waves readily p fog or darkness, a representation of the c described in detail above will be of ine value in the navigation of aircraft anc craft under conditions of poor, or no, vi The primary object of the invention fore to provide a method and system for representing the position and distance, i dimensional form, of all objects within extending an appreciable distance from t of observation.

Another object is to provide improved means to aid and assist in the navigation of mobile craft in darkness or in fog.

A further object is the provision of a visual three-dimensional representation of a region at a point remote from the region, under conditions of low or zero visibility.

Other and further objects will become apparent during the course of the following description and in the appended claims.

The principles of the invention will be more readily understood from the following detailed description of an illustrative embodiment in conjunction with the accompanying drawings in which:

Fig. 1 illustrates in block grammatic form a system of the invention which may be employed to explore a region as indicated;

Fig. 2 represents in perspective a region containing numerous obstacles, mainly buildings which can be employed to illustrate the use of systems of the invention;

Figs. 3 and 4 are illustrative of the type of three-dimensional representations provided by systems of the invention;

Fig. 5 illustrates an auxiliary type of representation readily obtainable in conjunction with systems of the invention when used at a fixed station; and Fig. 6 illustrates a form of electromagnetic wave prism type radiator or receiver which can conveniently be employed in systems of the invention.

In more detail in Fig. 1 transmitter 10 energizes a highly directive antenna 11 to emit radio waves. Since the size of the apparatus and the degree of directivity are both functions of wavelength, the shortest practicable wave-lengths will preferably be employed in systems of the invention, particularly for systems to be employed on aircraft. In the present state of the art, waves in the neighborhood of ten centimeters in length can conveniently be employed for aircraft use. In one convenient form transmitter 10 can be a conventional vacuum tube oscillator and antenna 11 can be an electromagnetic prism of the type described in the first of the above-mentioned copending applications of W. P. Mason, the prism having its longitudinal axis vertical. The electromagnetic prism is described in Mason's above-mentioned application, Serial No. 381,236, as being in one preferred form a coaxial line structure as shown in Fig. 6 of the accompanying drawing. The latter figure is substantially identical with Fig. 5 of the last-mentioned Mason application except that the designation numbers are primed.

As taught by Mason, the coaxial line structure of Fig. 6 comprises a main section of coaxial line having outer conductor 40' and inner conductor 42', this section of line being a dozen or more wave-lengths, of the highest frequency of the system, long, and being provided with regularly spaced shunting coaxial stub lines, comprising outer conductors 45', inner conductors 47' and short-circuiting end members 49', the main and stub lines being proportioned to constitute multisection band-pass wave filter, as described by Mason and R. A. Sykes in the Bell System Technical Journal for July 1937, at page 278, the outer conductor 40' of the main coaxial line having a small orifice 48' opposite each shunting stub line.

This structure will directively radiate each frequency within the pass-band of the wave filter at a particular predeter for each frequency differ jacent frequencies so tha plied to the prism is fr frequency swung over a the pass-band of the stru in the plane of the longit coaxial line structure will To improve the radia radiating holes Mason fu a small conductor 46' c end to inner conductor 4 trally positioned within substantially the line of the outer conductor 40'. conductively connect wit For the shunting stub ductors 47' all extend up connected to the inner co line and the outer condu connect with the outer co line respectively.

Energy to be radiated left ends of conductors 4 posite ends of these cond a member 44' having a sistance equal in magnitu impedance of the prism, energy from the right e eliminated and possible rective properties of the avoided. Spacing insulat 42' within conductor 40'.

The prism can, of cour reception as well as for corresponding properties most efficiently to a partic within the pass-band of particular different angl received energy. When receiver is, of course, cc free ends of conductors 4 tion 44' at the right e wanted reflections of ener could upset the directive the pirsm.

Prisms of this type tr maximum efficiency in th longitudinal axis of the holes and, of course, fror in which the holes are loc the device about its longi same time swinging or v the energy or varying the being radiated, over the the prism the scanning o sions, such as azimuth a Modulator 14, which r motor driven variable c varying the frequency of appropriate range to effec transmitted beam throu taught in the above-me W. P. Mason.

Motor 12 provides for by means of shaft 154 abc oscillatory manner so t horizontally as well as v cessively scan a large nu elements of a region, for of Fig. 2, which it is desi The motor of modulat drive variable potentiom tively, which are bridged current potential sources voltages for the horizontal deflecting plates 20 and vertical deflecting plates 18, respectively, of cathode ray oscilloscope 16 causing the ray of the tube to scan its target in synchronism with the scanning of the region 150 by the electromagnetic wave 34.

The use of potentiometers bridged across appropriate direct current potential sources and an oscilloscope in this manner is well known in the art and is, by way of example, illustrated and described in detail in my above-mentioned copending joint application. The use of a motor to produce oscillatory motion about a given axis is, of course, also well known in the art.

Receiving antenna 27 is preferably only broadly directive so as to receive reflections from any point within the region scanned by the highly directive beam of transmitting antenna 11. Alternatively the transmitting antenna could be broadly directive to cover the entire region simultaneously and antenna 27 could be highly directive and arranged to scan the region point by point. Or again both antennas could be made sharply directive and the two synchronized in their scanning action.

The received reflected waves 28 are combined and detected in receiver 26 with energy of the instantly transmitted waves derived from transmitter 10 over line 18, and beat-note frequencies resulting from this process, as described in my above-mentioned patents, are provided to conversion circuit 24.

Conversion circuit 24 converts the beat-note frequencies into direct current voltages whose magnitudes are proportional to the respective frequencies of the beat notes as described for the circuit actuating the indicating meter (altimeter) shown in United States Patent 2,247,662, issued July 1, 1941, to R. C. Newhouse. To avoid any likelihood that amplitude modulation of the reflected waves might result in incorrect intensity modulation of the cathode ray of systems of the present invention the principles taught in copending application of R. C. Newhouse, Serial No. 351,759, filed August 7, 1940, can be employed. United States Patent 2,261,272 issued to Newhouse on this application, November 4, 1941.

Circuit 24 further amplifies the direct current voltages thus obtained in a direct current amplifier having a negative slope so that a direct current voltage is obtained which varies inversely with the beat-note frequency. This voltage is then applied to the control grid 22 of cathode ray tube 16 and provides intensity modulation of the cathode ray.

From the above it is evident that lower beat-note frequencies result from reflections from nearer objects in the region scanned and are ultimately converted into larger direct current potentials which cause the cathode ray beam to become more intense (or brighter) than for higher beat-note frequencies which result from reflections from more remote objects in the region scanned. Where no reflections are obtained no voltage is provided control grid 22 by circuit 24 and the normal bias on grid 22 is sufficient to reduce the intensity of the ray to a substantially negligible value. This arrangement is, as was previously suggested, somewhat analogous to intensity modulation of the ray of an oscilloscope in television systems, the chief and very important difference being that in the latter systems the intensity modulation is employed to represent lighter color contrasts whereas in the systems of the present invention intensity modulation is employed solely to represent third dimension distance.

In Fig. 2 a representative region 150 of is indicated in which an assortment of bu 136, 138, 142, 144 and 146 of various heigh positions and water tanks 140 and 148 are in perspective.

In Fig. 3, upon the target 16 of a cathc oscilloscope, is indicated a representation stantially such as would be obtained upor ning region 150 of Fig. 2 with a system invention, such, for example, as that illustr Fig. 1, mounted on an aircraft approachi region. In representation 50, the indica region being the most intense, represents the building 136 in the area and the progre more distant buildings 138, 142, 144 and represented by the progressively less inte dications 38, 42, 44 and 46, respectively. 148 being the most distant object in the re represented by the faintest indication 48 of As previously mentioned, it should be parti noted that the intensity modulation of th ode-ray beam in the systems of this inver controlled by positive measurements of the distances to the several reflecting objects is of very substantial significance for it well established in this art that the ampli a received reflection is by no means a indication of the distance to the objec example, it has been repeatedly observed particular object at a known substantial stant distance will provide reflections of varying amplitudes depending upon th a which energy is reflected from the object. analogous to the glints obtained in the re of light from particular objects when at p the correct angle, the objects otherwis invisible or substantially so.

For convenient reference a block or p carrying several calibrated electrical lar 56 and 58 of standard intensities and push 64, 66 and 68 which when depressed will li adjacent lamp, respectively, is provided the oscilloscope target to assist the obse estimating from the intensities of the repr tions and approximate distances theret example, the potential applied to lamp 5 push button 64 is depressed can be adju that the intensity of the lamp correspond intensity of the indication provided by t tem for an object at a measured distance feet; similarly, lamps 56 and 58 can pro tensities corresponding to indications p by the system for objects at specific oth tances, such, for example, as 2500 feet a feet, respectively. These adjustments c veniently be made, for example, with the in a fixed position and with fixed target desired measured distances in which th intensities are to be adjusted.

Systems of the invention such for exar that illustrated in Fig. 1, can also be emp fixed observation points, for example at to scan regions of the air and to provid tegrated representation of all aircraft in gion scanned, the azimuth angle of a pa craft with respect to the point of observa ing indicated by the horizontal locatio corresponding indication, its vertical angl vertical location and its distance by th sity of the indication, the intensity of increasing as the craft approaches or de as the craft recedes from the observatio A representative pattern is indicated in indications 62, 64, 66, 68 and 70, representing aircraft at various horizontal and vertical angles and at various distances. The pattern of Fig. 4 is, of course, identical in nature with that of Fig. 3.

For use at such fixed observation points for following the movements of aircraft it will be advantageous to add a second cathode ray indicator 17 of Fig. 5, the beam of which scans an area 72 radially from a point in the lower left corner, the scanning angle being varied in synchronism with the vertical scanning motion of the exploratory radio beam of the system. Further provision is then made to arrest the turning motion of antenna 11 at any desired azimuth angle while continuing the frequency modulation of transmitter 10, so that vertical scanning is continued, and the beam is intensity modulated by the receipt of reflected waves so that for a vertical plane at any azimuth angle of the region scanned, a plan view of aircraft therein, their respective vertical angles, altitudes, and distances is visually presented. A representative pattern of this type is shown in Fig. 5, indications 74, 76 and 78 representing aircraft in a particular vertical plane (i. e., at the same azimuth angle but at different vertical angles). Radial scanning and distance indication for this single vertical plane arrangement can be effected in accordance with principles and systems described in the copending application of N. W. Bryant, Serial No. 423,757, filed December 20, 1941. In a typical system of this last-mentioned application, a highly directive antenna is rotated about a vertical axis, the distance to each object is determined by measuring the reflection time of reflected energy received therefrom and the azimuth angles and distances of all objects from which reflected energy is received are represented on a circular pattern the center of which represents the position of the exploratory apparatus, each object being represented by a mark at its corresponding azimuth angle and at a radial distance from the center point proportional to its actual distance from the exploratory apparatus. In the present instance, however, scanning through radial angles of a 90-degree range will usually be sufficient, since a vertical rather than a horizontal plane is being investigated.

Numerous additional applications of the principles of the invention will occur to those skilled in the art and no attempt has here been made to exhaustively cover all applications thereof. The scope of the invention is defined in the appended claims.

What is claimed is:

1. In an object locating system of the type which employs an exploratory energy beam to scan in azimuth and elevation, a region remote from said system, receives reflections of said beam from objects within said region and employs the received reflected energy to actuate an indicating mechanism having a movable marking member, the marking member being arranged to scan a two-dimensional area on a screen in synchronism with the scanning of the region by the energy beam, whereby the indicating mechanism presents a two-dimensional diagram of the position of objects within the region scanned by the system, the method of representing a third dimension, namely, distance, for the respective objects appearing in the two-dimensional representation which comprises determining the distance from the system to each object by measuring the reflection time of waves projected to strike the object and varying representations for the sever ance with the determined m tances thereto, respectively tances to respective objects intensities of their respectiv the diagram.

2. A navigational aid for 1 ing means on said craft for mensional representation of ative positions of objects wit tance from the craft, mea positively determining the ject from said craft and m intensities of the represent tive objects in accordance determined distances where is effectively represented.

3. A system for seeing by projected from an observat of view which comprises me radio waves as a sharp beam sional cross section of the at said point, including a cat for scanning synchronously ray beam over a correspon screen picture, means for r said beam and means for m tervals of reflections receiv determining thereby the di tive reflecting objects in tl said point, and means for tern of reflections as a tw according with the two-dim beam scanning, the brillian which picture being cont with the positive distances ceived reflections, respectiv 4. In a system for rend torial form at an observat gathered by receiving refle following combination, a fr of high frequency oscillat beam transmitting antenna displacement of the radio l observation in accordance swing, a receiver of the refl ulated waves for producing portional to the respective ing objects, a picture formi graph the beam of which i dimensional screen in syncl ning of the radio transmit for controlling the intensit beam in accordance with ing beat frequency output c impart information, as to respective objects from tl to the picture.

5. In an object locating tenna passing a particular a shaft supporting said ante the longitudinal axis there shaft to rotate, a source o said antenna, a motor act nected to said source of er the frequency of the energ within the first stated pa by the beam emitted by sai a region in space in two each other, a receiving an ceive reflections of said be in the region scanned by receiver and demodulato receiving antenna, a cor receiver and said source of energy directly providing said receiver with a small amount of the energy of said source, said receiver combining said directly derived energy with the received reflected energy and demodulating it to obtain beat notes the frequencies of which are indicative of the distances to the respective objects from which they are received, a cathode ray oscilloscope having horizontal and vertical deflecting plates and a control anode, a first variable potentiometer connected across a direct current source, the potentiometer being varied by the motor rotating the prism antenna the variable voltage obtained across the potentiometer being connected across one pair of deflecting plates, a second variable potentiometer connected across a direct current source, the potentiometer being varied by the motor actuating the modulator, the variable voltage obtained across the second potentiometer being connected across the other pair of deflecting plates whereby the ray of the oscilloscope when present is made to scan a two-dimensional area on its target in synchronism with the scanning of the region by the emitted beam of said prism antenna, a beat frequency conversion circuit connected to said receiver anad demodulator, said conversion circuit converting the beat note frequencies of said receiver into direct current voltages the values of which are inversely proportional to frequency, and a connection between the output of said conversion circuit and said control anode of said cathode ray oscilloscope whereby indications are provided by changes of intensity of the beam of said oscilloscope when reflected waves are received, the intensities being inversely proportional to the distances of the objects from which reflections are received and the directions of the objects being indicated by the position of the indications on the cathode ray oscilloscope target.

6. In an object locating system, the combination which comprises a source of wave energy, a directional energy beam projector connected to said source, a control mechanism moving said directional beam to scan a particular area, an oscilloscope having an indicating element and deflecting and intensity control elements operative to control said indicating element, a second control mechanism coupled with the first stated control mechanism and the deflecting control elements of said oscilloscope to control the movement of the indicating element in accordance with and synchronously with the scanning motion of said directional beam, a wave energy receptor adapted to receive reflections of said beam from objects within the area scanned and a reflection time measuring device interconnecting said receptor and the said intensity control element of said oscilloscope whereby indications are provided on said oscilloscope the positions of which indicate the directions of reflecting objects within the area scanned and the intensities of which represent the distances to the reflecting objects respectively.

7. In the art of object location energy waves, the method of providin simultaneous indications of the di distance from an observation point t plurality of objects within a predet gion which comprises projecting a fined exploratory beam of energy a ing thereto a scanning motion such th repeatedly scans in a regular manne predetermined region, imparting t marking element associated with ar device a scanning motion with res screen of said device similar to and s with the scanning motion imparted tc beam, receiving reflections of said e from objects within the region scanr determining for each reflected energy received the time required for that co travel from the observation point to tl object and back to the observation controlling the marking element of 1 ing device to provide indications at p scanning path corresponding to thos the scanning path of the explorato which reflections of the projected e are received, the intensity of these indications being varied in proport travel time determined for each pa flection whereby the direction of eacl reflecting object within the region denoted by the position of its corres dication on the screen of the indica and the distance to each object is the intensity of its corresponding indi the intensities of indications on th the device are controlled solely in with the distances of the deflecting spectively from the point of observati tirely independently of the amplitude spective received reflected energy c 8. In an object locating system, m observation point for emitting a dir ploratory energy beam, means for di beam to scan a predetermined region receiving reflections of said beam at vation point from objects within scanned, means for determining th times of the received reflections, 1 means for indicating on a two-dimer gram the respective relative positions jects from which reflections are re means for controlling the intensities dications afforded by the indicating accordance with the reflection time tions for the received reflections, resp

LLOYD ESPEN

REFERENCES CITED

The following references are of re file of this patent:

UNITED STATES PATENT

| Number | Name | |
|---|---|---|
| 2,231,929 | Lyman | F |